(12) United States Patent
Onishi et al.

(10) Patent No.: US 9,291,510 B2
(45) Date of Patent: Mar. 22, 2016

(54) MEASURING APPARATUS

(71) Applicants: Kenichi Onishi, Kyoto (JP); Kenji Yamamoto, Kyoto (JP)

(72) Inventors: Kenichi Onishi, Kyoto (JP); Kenji Yamamoto, Kyoto (JP)

(73) Assignee: LEVEX CORPORATION, Kyoto (JP)

( * ) Notice: Subject to any disclaimer, the term of this patent is extended or adjusted under 35 U.S.C. 154(b) by 394 days.

(21) Appl. No.: 13/813,561

(22) PCT Filed: Jan. 9, 2013

(86) PCT No.: PCT/JP2013/050152
§ 371 (c)(1),
(2) Date: Feb. 11, 2013

(87) PCT Pub. No.: WO2013/190855
PCT Pub. Date: Dec. 27, 2013

(65) Prior Publication Data
US 2013/0336362 A1    Dec. 19, 2013

(30) Foreign Application Priority Data

Jun. 19, 2012  (JP) .................................. 137734/2012
Jan. 9, 2013   (of) .......................... PCT/JP13/50152

(51) Int. Cl.
| G01K 7/00 | (2006.01) |
| G01N 25/00 | (2006.01) |
| G01K 13/00 | (2006.01) |
| G01K 7/36 | (2006.01) |
| G01D 5/20 | (2006.01) |

(52) U.S. Cl.
CPC .............. *G01K 13/00* (2013.01); *G01D 5/2013* (2013.01); *G01K 7/36* (2013.01)

(58) Field of Classification Search
USPC ......................................... 374/6, 45, 56, 184
See application file for complete search history.

(56) References Cited

U.S. PATENT DOCUMENTS

| 3,872,455 A | * | 3/1975 | Fuller et al. ............... 340/870.05 |
| 3,950,993 A | * | 4/1976 | Sidor ............................ 374/134 |
| 7,071,649 B2 | * | 7/2006 | Shafer et al. .................. 318/783 |

FOREIGN PATENT DOCUMENTS

| EP | 1 382 938 | 4/2002 |
| JP | 4189872 | 7/1992 |
| JP | 2006-300719 | 11/2006 |
| JP | 4699797 | 6/2011 |
| WO | WO-2009/054724 | 4/2009 |

* cited by examiner

*Primary Examiner* — Mirellys Jagan
(74) *Attorney, Agent, or Firm* — Jordan and Hamburg, LLP

(57) ABSTRACT

A measuring apparatus includes a sensor unit that includes a coil and a conductive cylinder arranged such that an area of an overlap zone varies as a position of an object changes; a capacitor and a resistor that make up a series circuit with the coil; a voltage applier that applies an input voltage Vi to the series circuit; a phase detector that detects a phase of a voltage Vo across the capacitor; a magnitude detector that detects a magnitude of the voltage Vo; feature data in which the phase, the magnitude, a temperature of the sensor unit, and an area of the overlap zone are associated with one another; and a calculator that calculates the temperature and the area based on the feature data using the phase and the magnitude detected by actual measurement of the voltage Vo.

4 Claims, 18 Drawing Sheets

Delay Time D    μs

| | | Stroke S | | | | mm |
|---|---|---|---|---|---|---|
| | | 0 | 10 | 20 | 30 | 40 |
| Temperature T °C | 0 | 7.2091 | 7.2658 | 7.3224 | 7.4238 | 7.4887 |
| | 20 | 7.2293 | 7.2790 | 7.3370 | 7.4276 | 7.5003 |
| | 40 | 7.2574 | 7.3021 | 7.3725 | 7.4616 | 7.5350 |
| | 60 | 7.2693 | 7.3189 | 7.4013 | 7.4857 | 7.5540 |
| | 80 | 7.2799 | 7.3309 | 7.4103 | 7.4919 | 7.5879 |

(b)

Peak Value A    V

| | | Stroke S | | | | mm |
|---|---|---|---|---|---|---|
| | | 0 | 10 | 20 | 30 | 40 |
| Temperature T °C | 0 | 5.179497 | 5.107330 | 5.023727 | 4.930582 | 4.858940 |
| | 20 | 5.082237 | 4.997826 | 4.929206 | 4.853723 | 4.759842 |
| | 40 | 4.883258 | 4.807409 | 4.729123 | 4.649134 | 4.566470 |
| | 60 | 4.764421 | 4.689211 | 4.613670 | 4.519156 | 4.445771 |
| | 80 | 4.709545 | 4.623195 | 4.541272 | 4.434434 | 4.358109 |

Fig. 4

(a) Stroke mm     Temperature 0 ℃

| Peak Value V | | 0 | 10 | 20 | 30 | 40 |
|---|---|---|---|---|---|---|
| | 5.179497 | 0 | | | | |
| | 5.107330 | | 10 | | | |
| | 5.023727 | | | 20 | | |
| | 4.930582 | | | | 30 | |
| | 4.858940 | | | | | 40 |
| | | 7.2091 | 7.2658 | 7.3224 | 7.4238 | 7.4887 |
| | | Delay Time μs | | | | |

(b) Stroke mm     Temperature 20 ℃

| Peak Value V | | 0 | 10 | 20 | 30 | 40 |
|---|---|---|---|---|---|---|
| | 5.082237 | 0 | | | | |
| | 4.997826 | | 10 | | | |
| | 4.929206 | | | 20 | | |
| | 4.853723 | | | | 30 | |
| | 4.759842 | | | | | 40 |
| | | 7.2293 | 7.2790 | 7.3370 | 7.4276 | 7.5003 |
| | | Delay Time μs | | | | |

(c) Stroke mm     Temperature 40 ℃

| Peak Value V | | 0 | 10 | 20 | 30 | 40 |
|---|---|---|---|---|---|---|
| | 4.883258 | 0 | | | | |
| | 4.807409 | | 10 | | | |
| | 4.729123 | | | 20 | | |
| | 4.649134 | | | | 30 | |
| | 4.566470 | | | | | 40 |
| | | 7.2574 | 7.3021 | 7.3725 | 7.4616 | 7.5350 |
| | | Delay Time μs | | | | |

(d) Stroke mm     Temperature 60 ℃

| Peak Value V | | 0 | 10 | 20 | 30 | 40 |
|---|---|---|---|---|---|---|
| | 4.764421 | 0 | | | | |
| | 4.689211 | | 10 | | | |
| | 4.613670 | | | 20 | | |
| | 4.519156 | | | | 30 | |
| | 4.445771 | | | | | 40 |
| | | 7.2693 | 7.3089 | 7.4013 | 7.4857 | 7.5540 |
| | | Delay Time μs | | | | |

(e) Stroke mm     Temperature 80 ℃

| Peak Value V | | 0 | 10 | 20 | 30 | 40 |
|---|---|---|---|---|---|---|
| | 4.709545 | 0 | | | | |
| | 4.623195 | | 10 | | | |
| | 4.541272 | | | 20 | | |
| | 4.434434 | | | | 30 | |
| | 4.358109 | | | | | 40 |
| | | 7.2799 | 7.3309 | 7.4103 | 7.4919 | 7.5879 |
| | | Delay Time μs | | | | |

Fig. 5

| | | Stroke mm | | | | | Temperature 0 ℃ |
|---|---|---|---|---|---|---|---|
| Peak Value | 5.179497 | 0 | | | | | |
| | 5.143414 | | 5 | | | | |
| | 5.107330 | | | 1 0 | | | |
| V | 5.023727 | | | | 2 0 | | |
| | 4.930582 | | | | | 3 0 | |
| | 4.858940 | | | | | | 4 0 |
| | | 7.2091 | 7.2075 | 7.2658 | 7.3224 | 7.4238 | 7.4887 |
| | | Delay Time μ s | | | | | |

Fig. 8

Feature Table
51

Stroke    mm          Temperature   0 ℃

| Peak Value | 5.179497 | 0 | | | | |
|---|---|---|---|---|---|---|
| | ...... | | 1 | | | |
| | ...... | | | 2 | | |
| V | ...... | | | | ...... | |
| | ...... | | | | | 3 9 |
| | 4.858940 | | | | | 4 0 |
| | 7.2091 | ...... | ...... | ...... | ...... | 7.4887 |
| | Delay Time | μ s | | | | |

Stroke    mm          Temperature   1 ℃

| Peak Value | ...... | 0 | | | | |
|---|---|---|---|---|---|---|
| | ...... | | 1 | | | |
| | ...... | | | 2 | | |
| V | ...... | | | | ...... | |
| | ...... | | | | | 3 9 |
| | ...... | | | | | 4 0 |
| | ...... | ...... | ...... | ...... | ...... | ...... |
| | Delay Time | μ s | | | | |

⋮

Stroke    mm          Temperature   7 9 ℃

| Peak Value | ...... | 0 | | | | |
|---|---|---|---|---|---|---|
| | ...... | | 1 | | | |
| | ...... | | | 2 | | |
| V | ...... | | | | ...... | |
| | ...... | | | | | 3 9 |
| | ...... | | | | | 4 0 |
| | ...... | ...... | ...... | ...... | ...... | ...... |
| | Delay Time | μ s | | | | |

Stroke    mm          Temperature   8 0 ℃

| Peak Value | ...... | 0 | | | | |
|---|---|---|---|---|---|---|
| | ...... | | 1 | | | |
| | ...... | | | 2 | | |
| V | ...... | | | | ...... | |
| | ...... | | | | | 3 9 |
| | 4.358109 | | | | | 4 0 |
| | ...... | ...... | ...... | ...... | ...... | 7.5879 |
| | Delay Time | μ s | | | | |

MEASURING APPARATUS

TECHNICAL FIELD

The present invention relates to a measuring apparatus and more particularly to a measuring apparatus capable of measuring both a displacement and a temperature, and applicable even to a case where it is difficult to access a coil.

BACKGROUND OF THE INVENTION

A position detector (see Patent Document 1, for example) has been known in the art that detects a change in a position of an object as a change in period of a continuous oscillating motion. The position detector includes a sensor unit, a resistor, a capacitor, and a comparator. The sensor unit includes a coil and an electrical conductor (or, in place of the conductor, a magnetic member) arranged such that an area of an overlap zone therebetween varies as the position of the object changes. The resistor is connected in series with the coil. The capacitor is charged and discharged through a series circuit made of the coil and the resistor. The comparator receives an input of a charging voltage of the capacitor, and charges the capacitor when an output of the comparator is at a high level but discharges the capacitor when the output is at a low level. In the position detector, a resistance of the coil, a resistance of the resistor, a capacitance of the capacitor, and a threshold value of the comparator are set so as to minimise the change in the period at an assumed temperature with respect to a change in at least one value of the resistance of the coil, the resistance of the resistor, the capacitance of the capacitor, and the threshold value of the comparator.

There has also been known a measuring apparatus (see Patent Document 2, for example) that includes a detection coil near which a metal object is allowed to be, a measuring unit that measures a quadrature value and an in-phase value of impedance of the detection coil, and a converter that obtains at least any one or both of a distance and a temperature using a function of distance, temperature, and quadrature value, a function of distance, temperature, and in-phase value, and the measured in-phase value and the measured quadrature value.

PATENT DOCUMENTS

[Patent Document 1] Japanese Patent No. 4189872
[Patent Document 2] Japanese Patent No. 4699797

The position detector disclosed in Patent Document 1 has a problem that the greater an environmental temperature of the sensor unit deviates from the assumed temperature, the greater the temperature affects the result of the measurement of the displacement. Furthermore, the position detector does not have the capability of directly measuring the temperature.

Although the measuring apparatus disclosed in Patent Document 2 is capable of measuring both the distance and the temperature, the measuring apparatus has a problem that, because it is necessary to measure the quadrature value and the in-phase value of impedance of the detection coil, application to such a case where, for example, the detection coil is embedded in an engine of a vehicle is difficult (i.e., accessing the detection coil is difficult).

It is an object of the present invention to provide a measuring apparatus capable of measuring both the displacement and the temperature, and also applicable even to a case where it is difficult to access a coil.

SUMMARY OF THE INVENTION

According to a first aspect of the present invention a measuring apparatus includes a sensor unit (10) that includes a coil (1) and an electrical conductor (2) arranged such that an area of an overlap zone varies as a position of an object changes, or the coil (1) and a magnetic member (2) arranged such that an area of an overlap zone varies as at position of an object changes; a capacitor (3) and a resistor (4) that make up a series circuits the series circuit including the coil (1); a voltage applying unit (5) that applies an input voltage Vi to the series circuit; a voltage detector (5) that detects a voltage Vo across the capacitor (3) or the resistor (4); a phase detector (5) that detects a phase of the voltage Vo; a magnitude detector (5) that detects a magnitude of the voltage Vo; feature data (51) in which the phase, the magnitude, an environmental temperature of the sensor unit (10), and a change in area of the overlap zone are associated with one another; and a calculator (5) that calculates the environmental temperature of the sensor unit (10) and the change in area of the overlap zone based on the feature data (51) using the detected phase and the magnitude obtained by actual measurement of the voltage Vo as parameters.

Inventors of the present invention have found that there is a unique relation among the environmental temperature of the sensor unit (10), the change in area of the overlap zone, the phase of the voltage Vo across the capacitor (3) or the resistor (4), and the magnitude of the voltage Vo. In other words, the inventors have found that the environmental temperature of the sensor unit (10) and the change in area of the overlap zone can be determined from the phase and the magnitude of the voltage Vo across the capacitor (3) or the resistor (4).

Accordingly, the measuring apparatus according to the first aspect enables measuring both a stroke S (=the change in area of the overlap zone) and a temperature T of a cylinder, for example, by actually measuring two parameters, which are the phase and the magnitude of the voltage Vo across the capacitor (3) or the resistor (4). Furthermore, the measuring apparatus is applicable even to a case where it is difficult to access the coil (1).

In the above configuration, the phase is, for example, a phase of the voltage Vo with respect to a phase of the input voltage Vi.

The magnitude is, for example, a peak value A (maximum value) or a root-mean-square value.

According to a second aspect of the present invention, in the measuring apparatus, the feature data (51) is created based on a result of measurement obtained by measuring the phase and the magnitude of the voltage Vo using the environmental temperature of the sensor unit (10) and the change in area of the overlap zone as parameters.

The measuring apparatus according to the second aspect can make accurate measurement on each machine even when the sensor units (10) of the machine vary in mechanical accuracy because the measuring apparatus creates the feature data (51) by making measurement on each of the machines.

According to a third aspect of the present invention, in the measuring apparatus (100), the phase detector (5) detects delay time D of the voltage Vo with respect to the input voltage Vi as the phase, and the magnitude detector (5) detects a peak value A as the magnitude.

The measuring apparatus (100) according to the third aspect can obtain the delay time D by comparing the phase of the input voltage Vi with the phase of the voltage Vo, and can obtain the peak value A by comparing a maximum value of the voltage Vo with a minimum value of the voltage Vo.

According to a fourth aspect of the present invention, in the measuring apparatus (200), the input voltage Vi is a periodic function waveform having a period $\tau$, the voltage detector (5) detects the voltage Vo at a sampling interval $k(=\tau*n/m)$ which is calculated by dividing an integer $n(\geq 1)$ multiple of the period τ of the input voltage Vi by an integer m(≥8), the phase detector (5) detects, as the phase, a phase component (x) based on "m*integer(≥1)" detected values of the voltage Vo, and the magnitude detector (5) detects, as the magnitude, the peak value A based on the "m*integer(≥1)" detected values of the voltage Vo.

The measuring apparatus (200) according to the fourth aspect can obtain the phase component x and the peak value A from the "m*integer(≥1)" detected values of the voltage Vo. Accordingly, the need of detecting the phase of the input voltage Vi is eliminated.

The measuring apparatus according to the present invention enables measuring both displacement and a temperature. Furthermore, the measuring apparatus is applicable even to a case where it is difficult to access a coil.

BRIEF DESCRIPTION OF DRAWINGS

FIGS. 3A and 3B are tables illustrating a result of measurement performed by measuring values of delay time D of a voltage Vo across a capacitor with respect to an input voltage and a peak value A of the voltage Vo, respectively, using a temperature T of a sensor unit and a stroke S as parameters.

FIGS. 4A to 4E are tables created based on the result of measurement indicated in FIGS. 3A and 3B.

FIG. 5 is a table created based on the tables indicated in FIGS. 4A to 4E.

FIG. 8 is a set of tables representing the feature table according to the first embodiment.

DESCRIPTION OF THE PREFERRED EMBODIMENTS

Exemplary embodiments of the present invention are explained in detail below with reference to the accompanying drawings. Note that this explanation is not intended to limit the present invention.

First Embodiment

Figure 1:
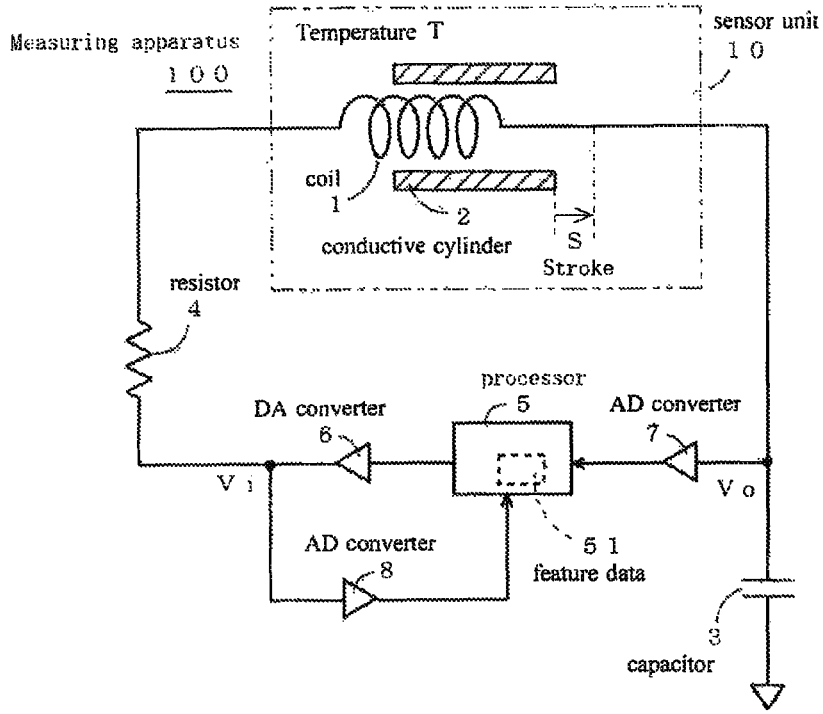
FIG. 1 is a circuit diagram of a measuring apparatus according to a first embodiment.

FIG. 1 is a configuration diagram of a measuring apparatus 100 according to a first embodiment.

The measuring apparatus 100 includes a sensor unit 10 that includes a coil 1 and a conductive cylinder 2 arranged such that a stroke S varies as the position of an object changes, causing an area of an overlap zone to change; a capacitor 3 and a resistor 4 that make up a series circuit in which the coil 1 is included; a DA converter 6 that applies an input voltage Vi to the series circuit made up of the coil 1, the capacitor 3, and the resistor 4; an AD converter 7 that detects a voltage Vo across the capacitor 3; an AD converter 8 that detects the input voltage Vi; and a processor 5.

Examples of a waveform of the input voltage Vi include sinusoidal waveform, triangular waveform, and rectangular waveform. The waveform is not necessarily a periodic function waveform for which integral over one period is zero.

Meanwhile, a magnetic cylinder can be used in lieu of the conductive cylinder 2.

The processor 5 outputs to the DA converter 6 a digital waveform value for applying the input voltage Vi to the series circuit made up of the coil 1, the capacitor 3, and the resistor 4, causes the AD converter 7 to measure the voltage Vo, and causes the AD converter 8 to measure the input voltage Vi.

The processor 5 also stores therein feature data 51 in which a delay time D of a phase of the voltage Vo with respect to the input voltage Vi, a peak value A of the voltage Vo, an environmental temperature T of the sensor unit 10, and the stroke S are associated with one another. The processor 5 calculates the environmental temperature T of the sensor unit 10 and the stroke S from the measured values of the delay time D and the peak value A of the voltage Vo based on the feature data 51.

Meanwhile, because the input voltage Vi is generated in the processor 5, the AD converter 8 becomes unnecessary if the processor 5 is caused to internally detect a state of the input voltage Vi. However, when the AD converter 8 is provided, a circuit that is independent of the processor 5 and that generates the input voltage Vi can be used and the input voltage Vi can be measured via the AD converter 8.

The coil 1, which is 2.5 mm in diameter and 60 mm in length, is a double-layer solenoid. Each layer of the coil 1 is made from 750 turns of enameled wire that is 0.06 mm in wire diameter.

The conductive cylinder 2 is a brass cylinder that is 5 mm in inner diameter, 6 mm in outer diameter, and 64 mm in length.

The overlap zone where the coil 1 and the conductive cylinder 2 overlap is 50 mm in length at a stroke=0 mm position, and the overlap zone is 10 mm in length at a stroke=40 mm position.

The capacitor 3 is a 10,000-pF multilayer ceramic capacitor.

The resistor 4 is a 30-Ω, 1/16-W ceramic resistor.

The input voltage Vi is sinusoidal wave having peak-to-peak voltage of 0 V-5.4 V.

Figure 2:
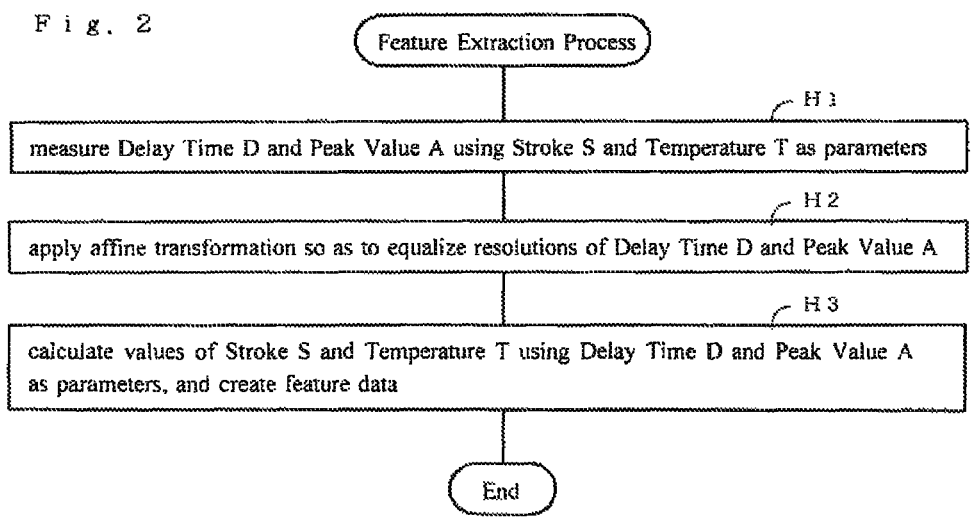
FIG. 2 is a flowchart of a feature extraction process according to the first embodiment.

FIG. 2 is a flowchart of a feature extraction process for creating the feature table 51.

At Step H1, the processor 5 measures the delay time D and the peak value A using the stroke S and the temperature T as parameters.

An example of result of measurement of the delay time D is illustrated in FIG. 3A. An example of result of measurement of the peak value A is illustrated in FIG. 4B.

Returning to FIG. 2, at Step H2, affine transformation is applied so as to equalize resolutions of the delay time D and the peak value A.

For example, a range of change of the delay time D is 0.3788 μs, and a range of change of the peak value A is 0.821388 V in the result of measurement indicated in FIGS. 3A and 3B. Accordingly, when plotted on a graph in which each square of a grid represents 0.0001 μs in the horizontal direction and 0.000001 V in the vertical direction, the stroke S and the temperature T are distributed in a considerably vertically elongated pattern. This can unfavorably result in failure in equalizing vertical, resolution and horizontal resolution in interpolation calculation, which will be described later. To this end, affine transformation is applied so that distribution of the stroke S and distribution of the temperature T are apart substantially 45 degrees from each other. As a result, vertical resolution and horizontal resolution can be equalized in interpolation calculation, which will be described later.

However, description using an example of affine-transformed numerical values can become complicated. Therefore, description is made using an example of not-yet-affine-transformed numerical values.

At Step H3, values of the stroke S and the temperature T are calculated using the delay time D and the peak value A as parameters, and the feature table 51 as illustrated in FIG. 8 is created.

A method for creating the feature table 51 is described with reference to FIGS. 4 to 8.

First, as illustrated in FIG. 4A, pairs of the delay time D and the peak value A that give the stroke S=0 mm, 10 mm, 20 mm, and 40 mm with the temperature T=0° C. are extracted from the result of measurement indicated in FIGS. 3A and 3B. Then, as illustrated in FIG. 4B, pairs of the delay time D and the peak value A that give the stroke S=0 mm, 10 mm, 20 mm, and 40 mm with the temperature T=20° C. are extracted from the result of measurement indicated in FIGS. 3A and 3B. Subsequently, pairs of the delay time D and the peak value A are extracted in a similar manner as indicated in FIGS. 4C to 4E.

Next, interpolation data is added to each of the tables indicated in FIGS. 4A to 4E.

For example, as illustrated in FIG. 5, interpolation data for the stroke S=5 mm is added to the table indicated in FIG. 4A. This interpolation data containing the pair of the delay time D and the peak value A for the stroke S=5 mm is calculated from the pair of the delay time D and the peak value A for the stroke S=0 mm and the pair of the delay time D and the peak value A for the stroke S=10 mm by linear interpolation. Subsequently, interpolation data is added in a similar manner until a rational amount of data is obtained.

Figure 6:
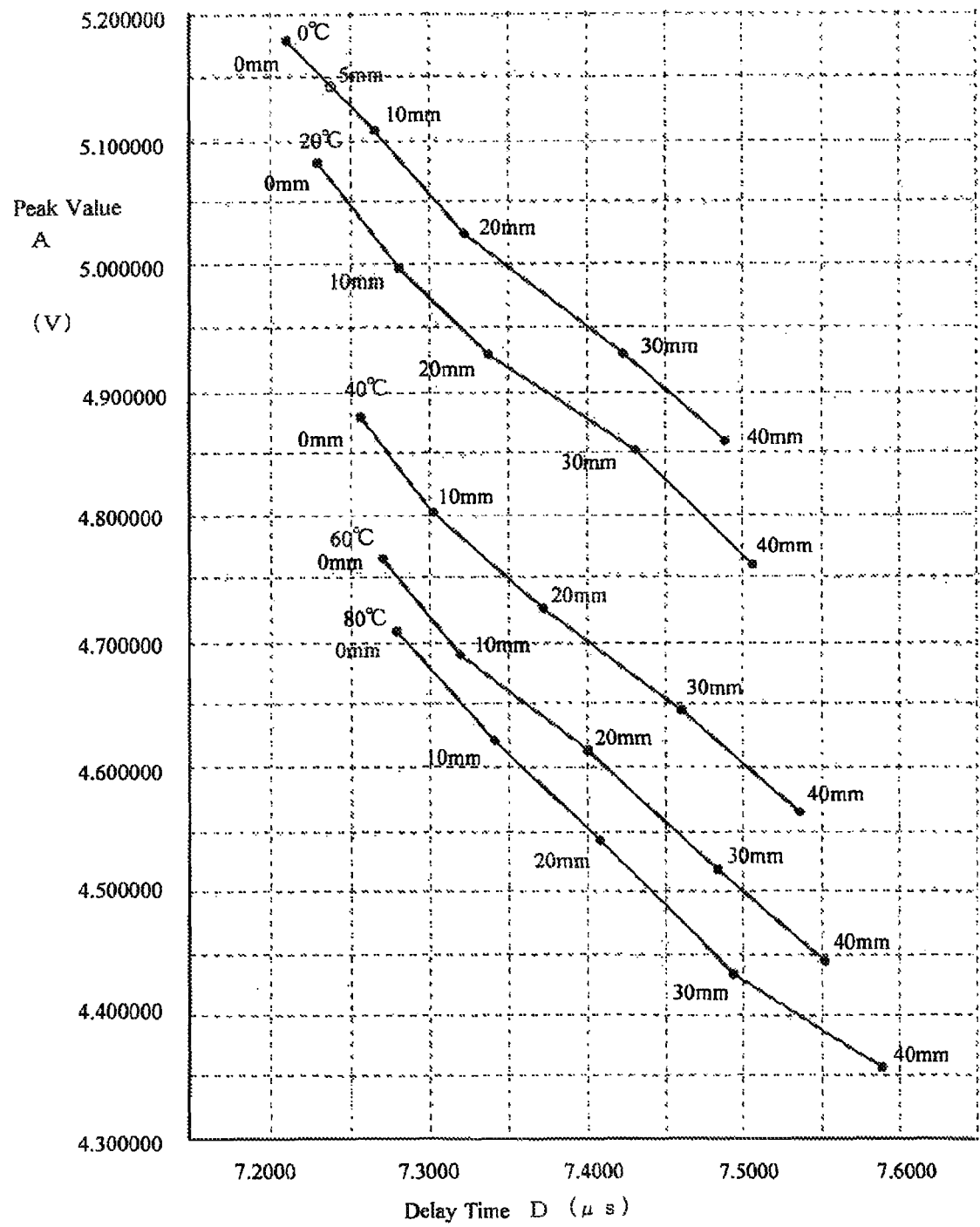
FIG. 6 is a graph obtained by plotting values shown in the tables indicated in FIG. 5.

Thus, the data shown in FIG. 6 in which a large number of feature values that form polygonal lines, each line corresponding to one of different values of the temperature T, is obtained.

Figure 7:
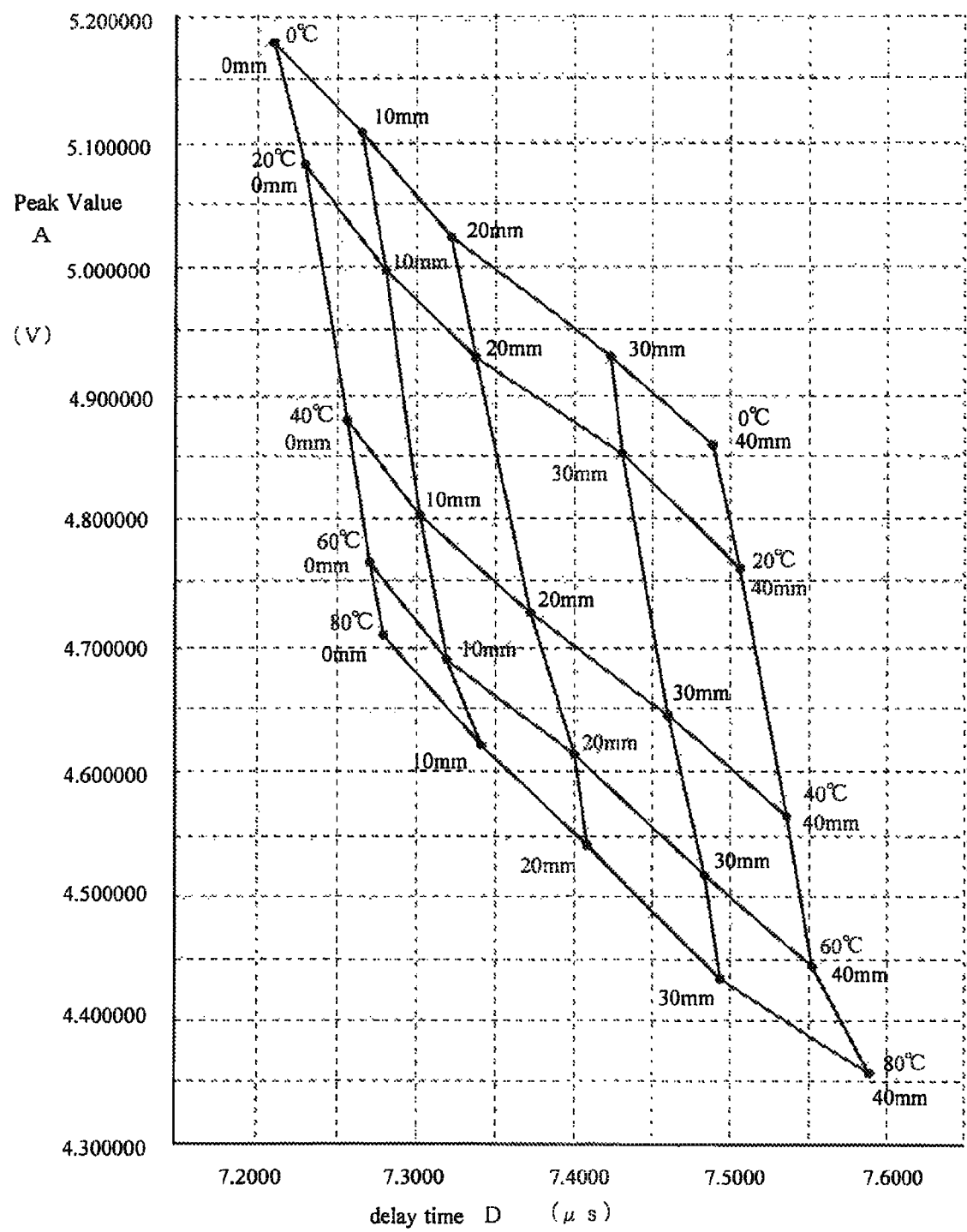
FIG. 7 is a graph obtained by plotting values shown in a feature table according to the first embodiment.

Next, interpolation data for the temperature T is also added as required. When the thus-obtained feature values are plotted on a graph, and the feature values are connected with line segments, a mesh of the stroke S and the temperature T is formed on the graph as illustrated in FIG. 7. This mesh represents the feature table 51 indicated in FIG. 8.

In the feature table 51 indicated in FIG. 8, the stroke S is in increments of 1 mm, and the temperature is in increments of 1° C.

Figure 9:
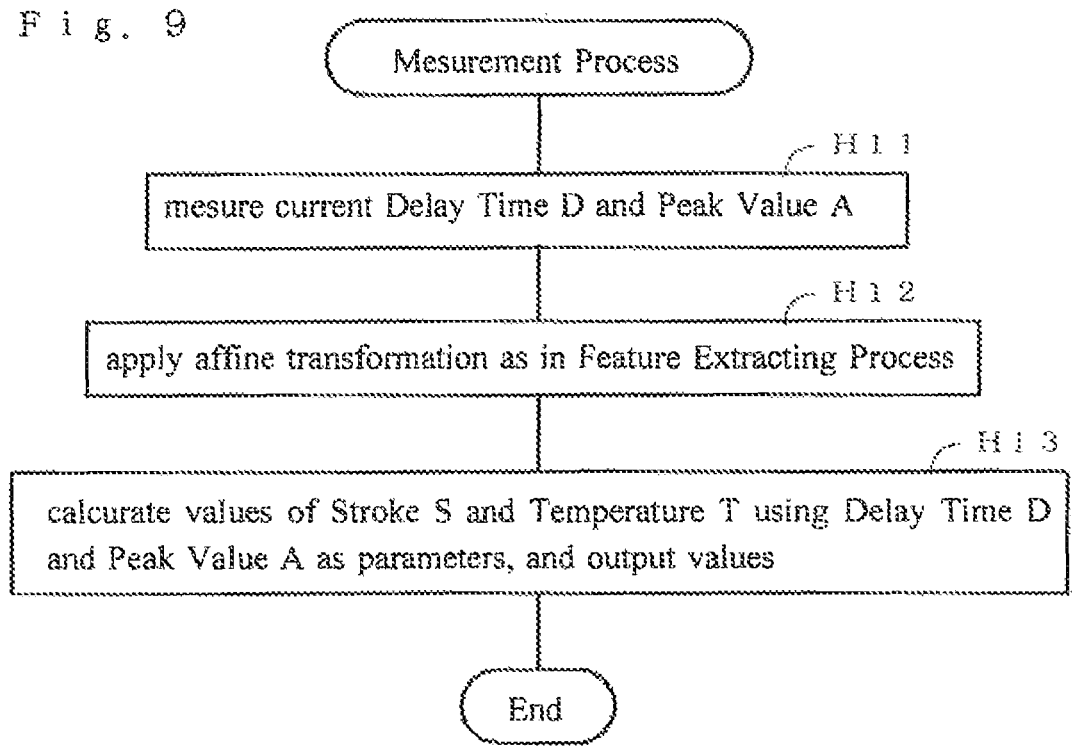
FIG. 9 is a flowchart of a measurement process according to the first embodiment.

FIG. 9 is a flowchart of a measurement process.

At Step H11, the processor 5 measures the current delay time D and peak value A.

At Step H12, the processor 5 applies the same affine transformation as that applied at Step H2 of FIG. 2 to the measured values of the delay time D and the peak value A.

However, description using an example of affine-transformed numerical values can become complicated. Therefore, description is made using an example of not-yet-affine-transformed numerical values.

At Step H13, the processor 5 calculates values of the stroke S and the temperature T based on the feature table 51 using the delay time D and the peak value A as parameters, and outputs the values.

A method for this calculation is conceptually described with reference to FIGS. 10 and 11.

Figure 10:
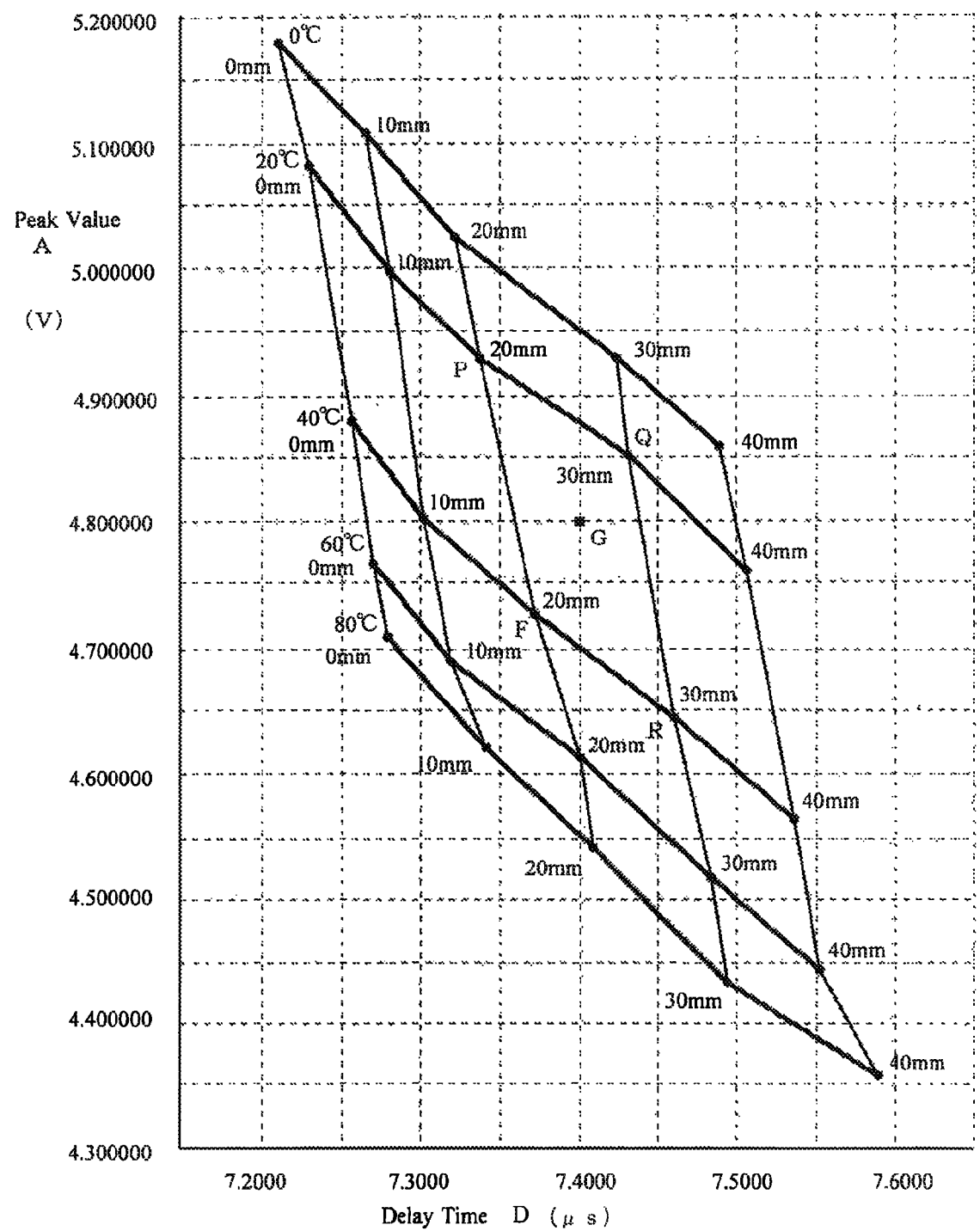
FIG. 10 is a graph on which measured values of the delay time D and the peak value A are plotted.

As illustrated in FIG. 10, when the measured values are the delay time D=7.4000 μs and the peak value A=4.800000 V, the measured point G(D, A) is in a mesh surrounded by feature values P, Q, F, and R.

Figure 11:
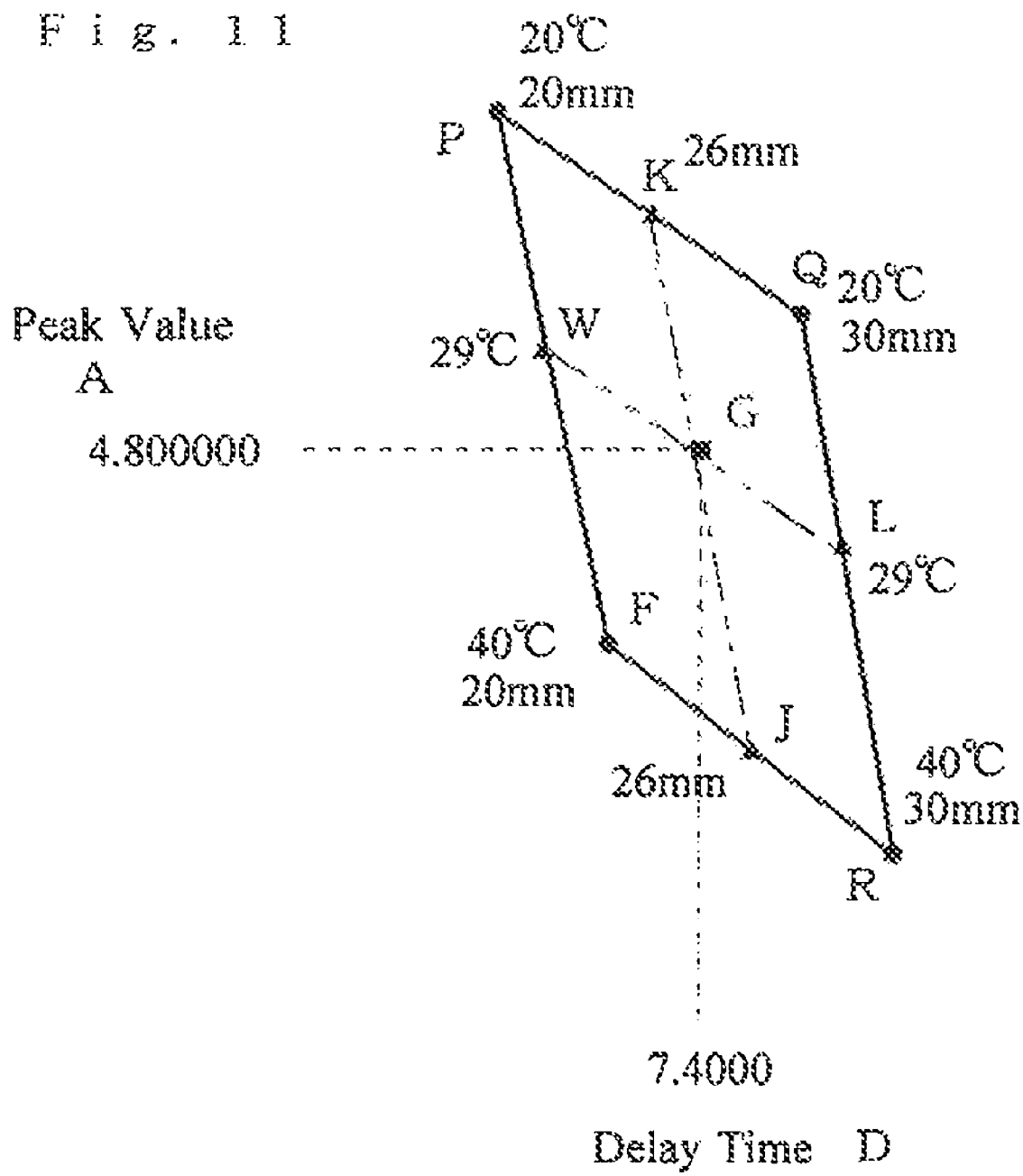
FIG. 11 is a diagram for explaining a method for calculating a temperature T and a stroke S from the measured values of the delay time D and the peak value A.

As illustrated in FIG. 11, the processor 5 draws an imaginary straight line extending through the measured point G(D, A), and through a point K on a line segment PQ and a point J on a line segment FR having the same stroke value, calculates the stroke value S (in FIG. 11, 26 mm) of the points K and J, and outputs the values as a result of measurement. The processor 5 also draws an imaginary straight line extending through the measured point G(D, A), and a point W on a line segment PF and a point L on a line segment QR having the same temperature value, calculates the temperature value T (in FIG. 11, 29° C.) of the points W and L, and outputs the values as a result of measurement.

The measuring apparatus 100 according to the first embodiment enables measuring both the stroke S and the temperature T. Furthermore, the measuring apparatus 100 is applicable even to a case where it is difficult to access the coil 1.

Second Embodiment

Figure 12:
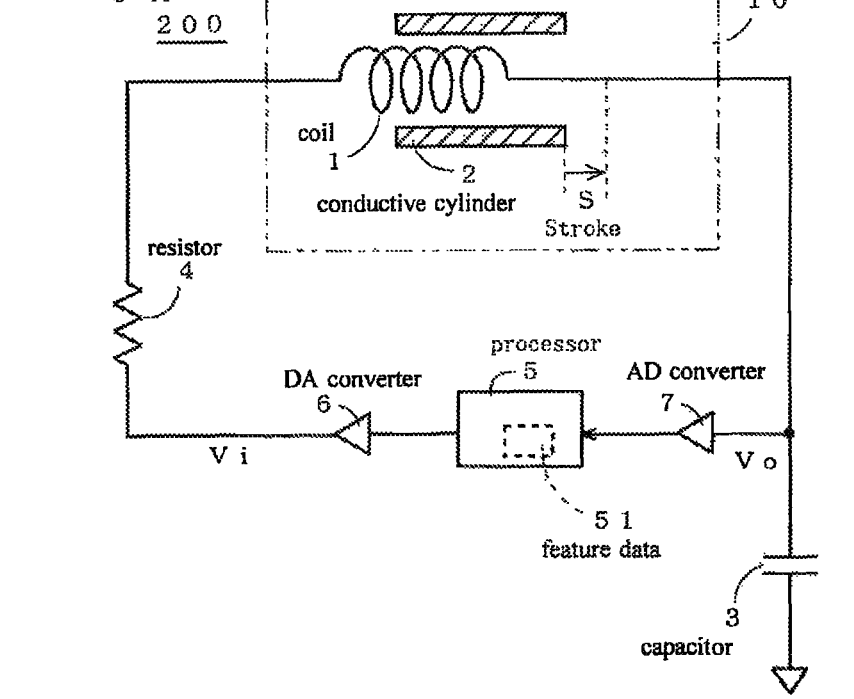
FIG. 12 is a circuit diagram of a measuring apparatus according to a second embodiment.

FIG. 12 is a configuration diagram of a measuring apparatus 200 according to a second embodiment.

The measuring apparatus 200 includes the sensor unit 10 that includes the coil 1 and the conductive cylinder 2 arranged such that the stroke S varies as the position of an object changes, causing an area of an overlap zone to change; the capacitor 3 and the resistor 4 that make up a series circuit in which the coil 1 is included; the DA converter 6 that applies the input voltage Vi to the series circuit made up of the coil 1, the capacitor 3, and the resistor 4; the AD converter 7 that detects the voltage Vo across the capacitor 3; and the processor 5.

The input voltage Vi is a periodic function waveform for which integral over one period is zero. Examples of the waveform include sinusoidal waveform and triangular waveform.

Meanwhile, a magnetic cylinder can be used in lieu of the conductive cylinder 2.

The processor 5 continuously outputs to the DA converter 6 a digital waveform value for applying the input voltage Vi to the series circuit made up of the coil 1, the capacitor 3, and the resistor 4.

In addition, the processor 5 causes the AD converter 7 to measure the voltage Vo at a sampling interval $k(=\tau*n/m)$, which is calculated by dividing an integer $n(\geq 1)$ multiple of the period $\tau$ of the input voltage Vi by an integer $m(\geq 8)$. Then, the processor 5 detects a phase component x and the peak value A based on "m*integer($\geq$1)" detected values of the voltage Vo as will be described later.

The processor 5 stores therein the feature data 51 in which the phase component x, the peak value A, the environmental temperature T of the sensor unit 10, and the stroke S are associated with one another. The processor 5 calculates the environmental temperature T of the sensor unit 10 and the stroke S from the measured values of the phase component x and the peak value A of the voltage Vo based on the feature data 51.

The coil 1 which is 2.5 mm in diameter and 60 mm in length, is a double-layer solenoid. Each layer of the coil 1 is made from 750 turns of enameled wire that is 0.06 mm in wire diameter.

The conductive cylinder 2 is a brass cylinder that is 5 mm in inner diameter, 6 mm in outer diameter, and 64 mm in length.

The overlap zone where the coil 1 and the conductive cylinder 2 overlap is 50 mm in length at a stroke=0 mm position, and the overlap zone is 10 mm in length at a stroke=40 mm position.

The capacitor 3 is a 10,000-pF multilayer ceramic capacitor.

The resistor 4 is a 30-Ω, 1/16-W ceramic resistor.

Figure 13:
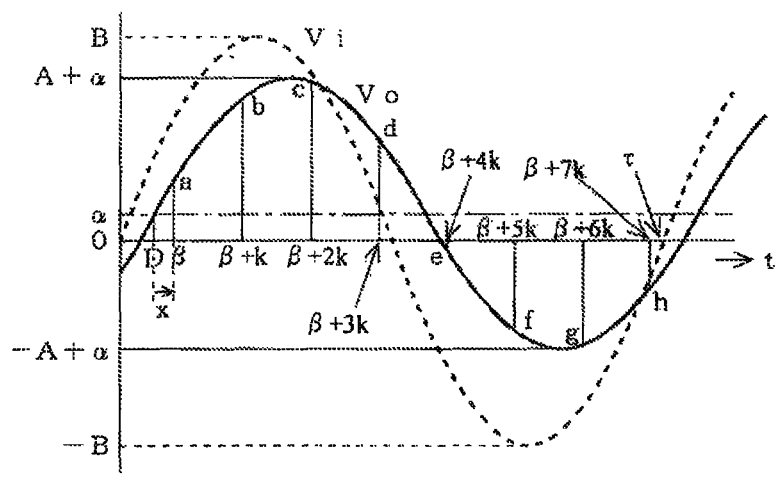
FIG. 13 is an illustration of a waveform of an input voltage Vi, a waveform of a voltage Vo, and sampling timing.

It is assumed that the input voltage Vi is defined as $Vi=B \sin\{2\pi t/\tau\}$ as indicated by a dashed line in FIG. 13. It is assumed that the voltage Vo is defined as $Vo=A \sin\{2\pi(t-D)/\tau\}+\alpha$ as indicated by a solid line in FIG. 13. D denotes the delay time D described in the first embodiment. $\alpha$ is a DC component.

$\beta$, $\beta+k$, $\beta+2k$, ..., and $\beta+7k$ indicated in FIG. 13 denote sampling time of the voltage Vo with n=1 and m=8. The sampling interval k is $\tau/8$. The period $\tau$ of the input voltage Vi is 10 μs, for example.

Although $\beta$ denotes phase-shift time between the phase of the input voltage Vi and the sampling time, it is unnecessary to obtain $\beta$ for measurement as will be described in detail later. In other words, sampling of the voltage Vo may be started at arbitrary timing irrespective of the phase of the input voltage Vi. Accordingly, it is unnecessary to detect the phase of the input voltage Vi even when a circuit, which is independent of the processor 5, that generates the input voltage Vi is used.

The detected value "a" of the voltage Vo at sampling time $\beta$ is given as $$a=A \sin\{2\pi(\beta-D)/\tau\}+\alpha.$$

Here, when the phase component x is substituted with $x=2\pi(\beta-D)/\tau$, $$a=A \sin\{x\}+\alpha$$

is obtained.

A detected value b of the voltage Vo at sampling time $\beta+k$ is given as $$b = A\sin\{2\pi(\beta+k-D)/\tau\}+\alpha$$
$$= A\sin\{2\pi(\beta-D)/\tau + 2\pi k/\tau\}+\alpha$$
$$= A\sin\{x+\pi/4\}+\alpha$$
$$= (A/\sqrt{2})\sin\{x\}+(A/\sqrt{2})\cos\{x\}+\alpha.$$

A detected value c of the voltage Vo at sampling time $\beta+2k$ is given as $$c = A\sin\{2\pi(\beta+2k-D)/\tau\}+\alpha$$
$$= A\sin\{2\pi(\beta-D)/\tau + 4\pi k/\tau\}+\alpha$$
$$= A\sin\{x+\pi/2\}+\alpha$$
$$= A\cos\{x\}+\alpha.$$

Similarly, detected values d, e, f, g, and h of the voltage Vo at sampling time $\beta+3k$, $\beta+4k$, $\beta+5k$, $\beta+6k$, and $\beta+7k$ are given as $$d=-(A/\sqrt{2})\sin\{x\}+(A/\sqrt{2})\cos\{x\}+\alpha,$$

$$e=-A \sin\{x\}+\alpha,$$

$$f=-(A/\sqrt{2})\sin\{x\}-(A/\sqrt{2})\cos\{x\}+\alpha,$$

$$g=-A \cos\{x\}+\alpha, \text{ and}$$

$$h=(A/\sqrt{2})\sin\{x\}-(A/\sqrt{2})\cos\{x\}+\alpha.$$

Therefore, the following equations are obtained.

$$a+b+c+d+e+f+g+h=8\alpha$$

$$\alpha=(a+b+c+d+e+f+g+h)/8$$

Accordingly, the DC component $\alpha$ can be obtained by calculating a sum of the detected values a, b, ..., and h sampled over one period and dividing the sum by "8". Alternatively, a method (moving average cost method) of repeatedly calculating the DC component $\alpha$ by calculating a sum of detected values that are sampled over immediately-preceding $M(\geq 2)$ periods and dividing the sum by "8*M" may be employed.

Furthermore, from $$A \sin\{x\}=a-\alpha,$$

$$A \sin\{x\}=\alpha-e,$$

$$A \cos\{x\}=c-\alpha, \text{ and}$$

$$A \cos\{x\}=\alpha-g,$$

the following equations are derived.

$$(a-\alpha)(\alpha-e)=A \sin\{x\}*A \sin\{x\}$$

$$(c-\alpha)(\alpha-g)=A \cos\{x\}*A \cos\{x\}$$

Obtained from these is $$(a-\alpha)(\alpha-e)+(c-\alpha)(\alpha-g)=A*A.$$

Accordingly, the peak value A can be calculated from odd-numbered detected values of the detected values a, b, ..., and h sampled over one period and the DC component $\alpha$.

Similarly, the peak value A can also be calculated using the same equation from even-numbered detected values sampled over the one period and the DC component α.

$$(b-\alpha)(\alpha-f)+(d-\alpha)(\alpha-h)=A*A$$

Accordingly, the peak value A can be calculated from every-other detected values that are sampled over the one period, without the need for knowing whether the every-other detected values are the odd-numbered detected values a, c, e, and g or the even-numbered detected values b, d, f, and h.

Furthermore, the following equations are derived.

$$\tan\{x\}=(a-\alpha)/(c-\alpha)$$

$$\tan\{x\}=(a-\alpha)/(\alpha-g)$$

$$\tan\{x\}=(\alpha-e)/(c-\alpha)$$

$$\tan\{x\}=(\alpha-e)/(\alpha-g)$$

Accordingly, the phase component x can be calculated from any one of $$x=\text{arc tan }\{[(a-\alpha)/(c-\alpha)+(\alpha-e)/(\alpha-g)]/2\}$$

and $$x=\text{arc tan }\{[(a-\alpha)/(\alpha-g)+(\alpha-e)/(c-\alpha)]/2\}.$$

Figure 14:
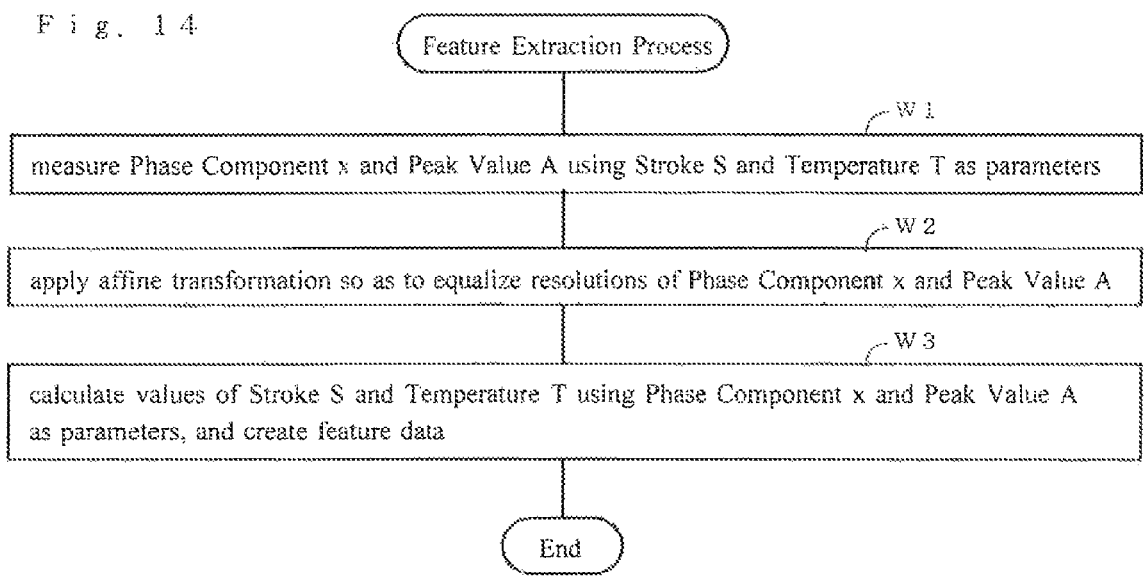
FIG. 14 is a flowchart of a feature extraction process according to the second embodiment.

FIG. 14 is a flowchart of a feature extraction process for creating the feature table 51.

At Step W1, the processor 5 measures the phase component x and the peak value A using the stroke S and the temperature T as parameters.

At Step W2, affine transformation is applied so as to equalise resolutions of the phase component x and the peak value A.

At Step W3, values of the stroke S and the temperature T are calculated using the phase component x and the peak value A as parameters, and the feature table 51 is created.

Figure 15:
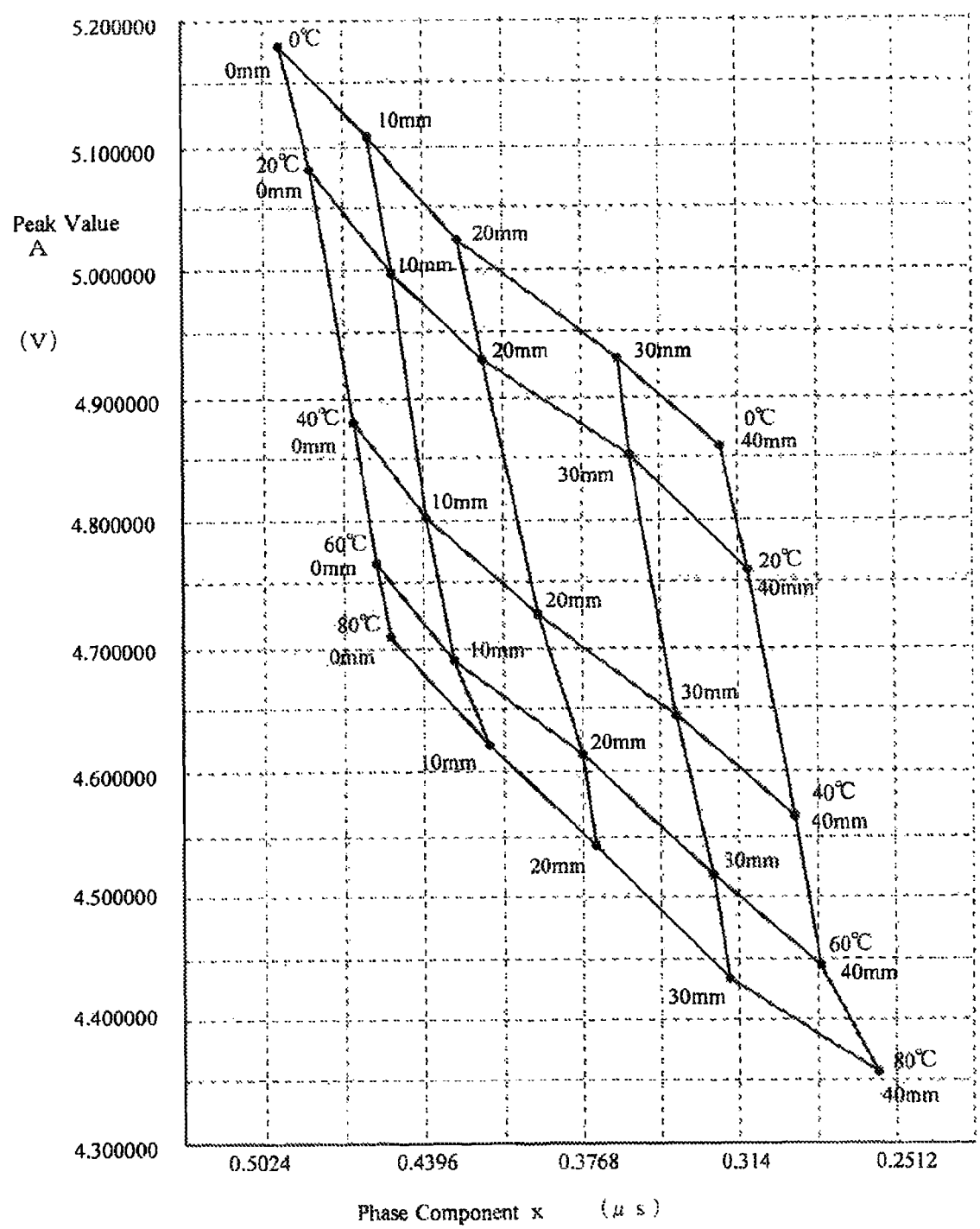
FIG. 15 is a graph obtained by plotting values shown in a feature table according to the second embodiment.

The mesh illustrated in FIG. 15 represents the feature table 51.

The phase component $x=2\pi(\beta-D)/\tau$ can be transformed into $$x=k1-k2*D,$$

where $k1=2\pi\beta/\tau$ and $k2=2\pi/\tau$ are constants.

Accordingly, the meshes illustrated in FIG. 15 and FIG. 7 are essentially the same, with only exception of values represented by the horizontal axis. Meanwhile, values of the phase component x indicated in FIG. 15 are obtained by converting values of the delay time D indicated in FIG. 7 to values of the phase component x with $\tau=10$ μs and $\beta=8$ μs.

Figure 16:
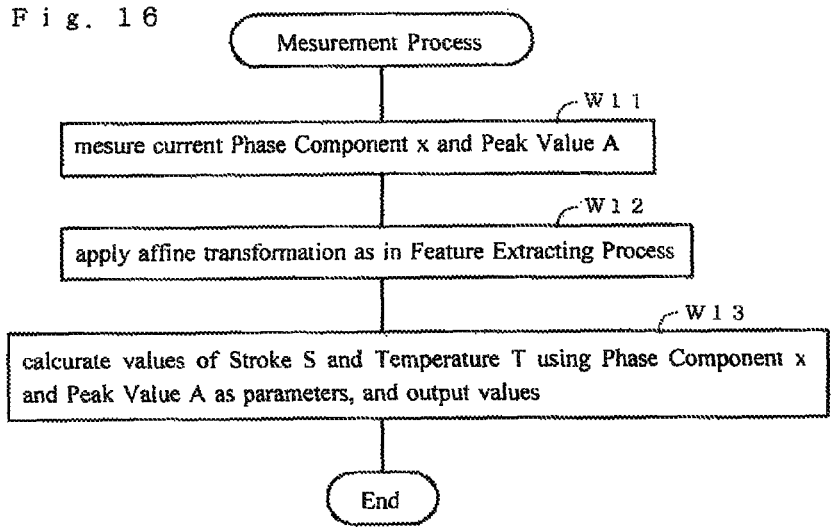
FIG. 16 is a flowchart of a measurement process according to the second embodiment.

FIG. 16 is a flowchart illustrating a measurement process.

At Step W11, the processor 5 measures the current phase component x and peak value A.

At Step W12, the processor 5 applies the same affine transformation as that applied at Step W2 of FIG. 14 to measured values of the phase component x and the peak value A.

At Step W13, the processor 5 calculates values of the stroke S and the temperature T based on the feature table 51 using the phase component x and the peak values A as parameters, and outputs the values.

Figure 17:
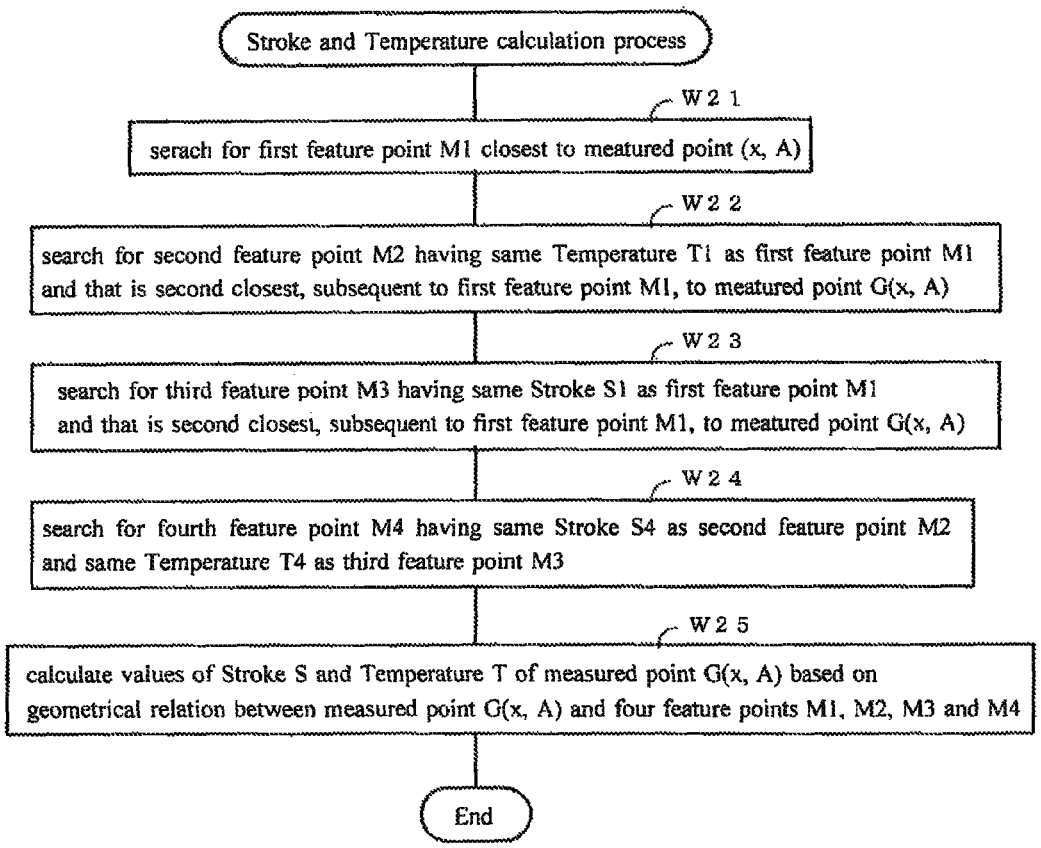
FIG. 17 is a flowchart of a stroke/temperature calculating process according to the second embodiment.

FIG. 17 is a flowchart illustrating a stroke/temperature calculation process to be performed at Step W13 of FIG. 16.

Figure 18:
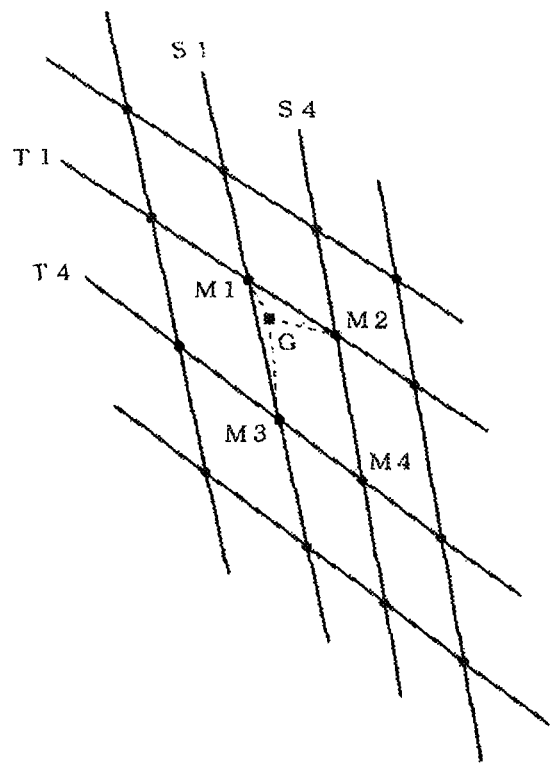
FIG. 18 is a graph of a case in which feature points are distributed substantially uniformly.

At Step W21, search for a first feature point M1 closest to a measured point G(x, A) is performed as illustrated in FIG. 18.

At Step W22, search for a second feature point M2 that has the same temperature T1 as that of the first feature point M1 and that is second closest, subsequent to the first feature point M1, to the measured point G(x, A) is performed as illustrated in FIG. 18.

At Step W23, search for a third feature point M3 that has the same stroke S1 as that of the first feature point M1 and that is second closest, subsequent to the first feature point M1, to the measured point G(x, A) is performed as illustrated in FIG. 18.

At Step W24, search for a fourth feature point M4 that has the same stroke S4 as that of the second feature point M2 and the same temperature T4 as that of the third feature point M3 is performed as illustrated in FIG. 18.

At Step W25, values of the stroke S and the temperature T of the measured point G(x, A) are calculated based on a geometrical relation between the measured point G(x, A) and the four feature points M1, M2, M3, and M4.

Figure 19:
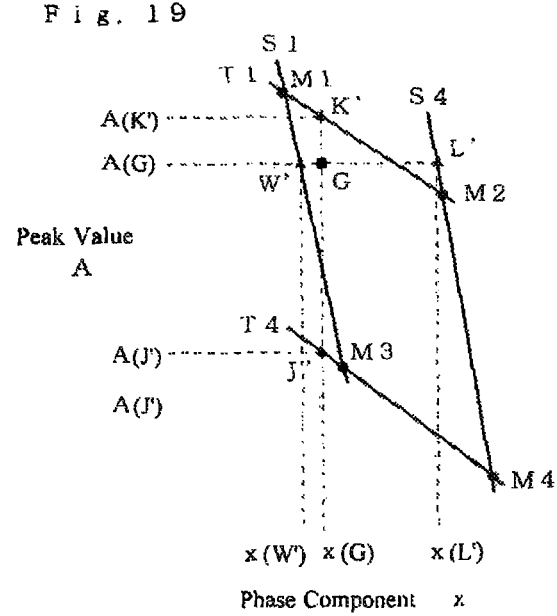
FIG. 19 is a diagram for explaining a method for calculating a temperature T and a stroke S from measured values of a phase component x and a peak value A.

As illustrated in FIG. 19, a point W' that is on a straight line extending through the feature points M1 and M3 and has the same peak value A(G) as that of the measured point G(x, A) is determined by interpolation calculation based on data about the feature points M1 and M3, and a phase component x(W') of this point W' is calculated. Furthermore, a point L' that is on a straight line extending through the feature points M1 and M4 and has the same peak value A(G) as that of the measured point G(x, A) is determined by interpolation calculation based on data about the feature points M2 and M4, and a phase component x(L') of this point L' is calculated. The stroke S of the measured point G(x, A) is given as $$S=[\{x(L')-x(G)\}S1+\{x(G)-x(W')\}S4]/\{x(L')-x(W')\}.$$

Here, S1 is a value of the stroke at the feature point M1, and S4 is a value of the stroke at the feature point M4.

As illustrated in FIG. 19, a point K' that is on a straight line extending through the feature points M1 and M2 and has the same phase component x(G) as that of the measured point G(x, A) is determined by interpolation calculation based on data about the feature points M1 and M2, and a peak value A(K') of this point K' is calculated. Furthermore, a point J' that is on a straight line extending through the feature points M3 and M4 and has the same phase component x(G) as that of the measured point G(x, A) is determined by interpolation calculation based on data about the feature points M3 and M4, and a peak value A(J') of this point J' is calculated. The temperature T of the measured point G(x, A) is given as $$T=[\{A(J')-A(G)\}T1+\{A(G)-A(K')\}T4]/\{A(J')-A(K')\}$$

Here, T1 is a value of the temperature at the feature point M1, and T4 is a value of the temperature at the feature point M4.

FIG. 18 is prepared based on an assumption that the feature points have substantially equally spaced distribution. Obtained in this case are the four feature points M1, M2, M3, and M4 that surround the measured point G(x, A).

Figure 20:
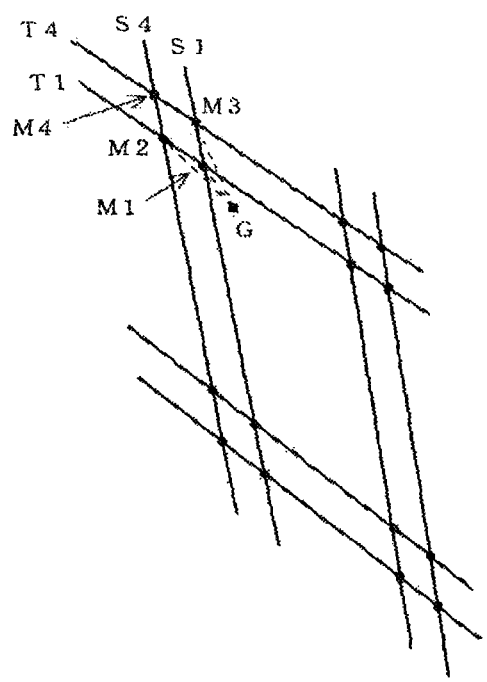
FIG. 20 is a graph of a case in which feature points are distributed extremely non-uniformly.

In contrast, FIG. 20 is on an assumption that the feature points have extremely unequally spaced distribution. Obtained in this case are the four feature points M1, M2, M3, and M4 that do not surround the measured point G(x, A).

Figure 21:
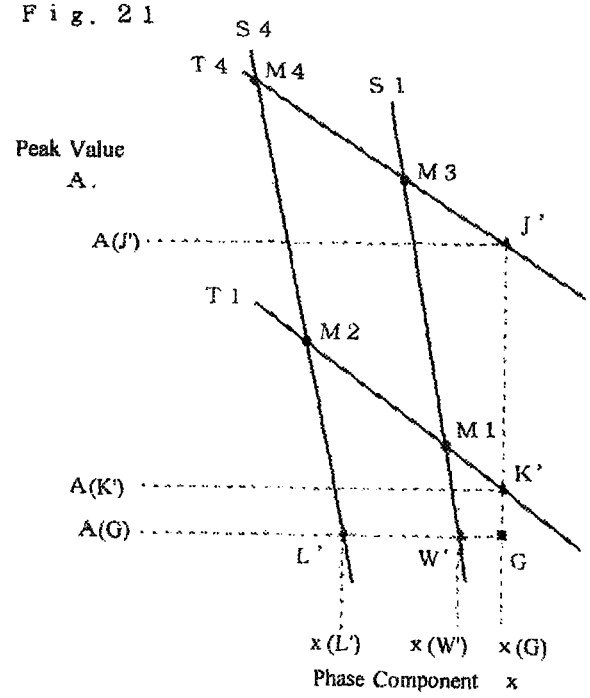
FIG. 21 is a diagram explaining a method for calculating the temperature T and the stroke S from measured values of the phase component x and the peak value A.

However, even in this case, as illustrated in FIG. 21, the point W' that is on the straight line extending through the feature points M1 and M3 and has the same peak value A(G) as that of the measured point G(x, A) is determined by interpolation calculation based on the data about the feature points M1 and M3, and the phase component x(W') of this point W' is calculated. Furthermore, the point L' that is on the straight line extending through the feature points M2 and M4 and has the same peak value A(G) as that of the measured point G(x, A) is determined by interpolation calculation based on the data about the feature points M2 and M4, and the phase component x(L') of this point L' is calculated. The stroke S of the measured point G (x, A) is given as $$S=[\{x(L')-x(G)\}S1+\{x(G)-x(W')\}S4]/\{x(L')-x(W')\}$$

Here, S1 is the value of the stroke at the feature point M1, and S4 is the value of the stroke at the feature point M4.

As illustrated in FIG. 21, the point K' that is on the straight line extending through the feature points M1 and M2 and has the same phase component x(G) as that of the measured point G(x, A) is determined by interpolation calculation based on the data about the feature points M1 and M2, and the peak value A(K') of this point K' is calculated. Furthermore, the point J' that is on the straight line extending through the feature points M3 and M4 and has the same phase component x(G) as that of the measured point G(x, A) is determined by interpolation calculation based on the data about the feature points M3 and M4, and the peak value A(J') of this point J' is calculated. The temperature T of the measured point G(x, A) is given as $$T=[\{A(J')-A(G)\}T1+\{A(G)-A(K')\}T4]/\{A(J')-A(K')\}$$

Here, T1 is the value of the temperature at the feature point M1, and T4 is the value of the temperature at the feature point M4.

The measuring apparatus 200 according to the second embodiment enables measuring both the stroke S and the temperature T. Furthermore, the measuring apparatus 200 is applicable even to a case where it is difficult to access the coil 1. In addition, utilizing the phase component x provides an advantage of eliminating the need of detecting the phase of the input voltage Vi.

Third Embodiment

Figure 22:
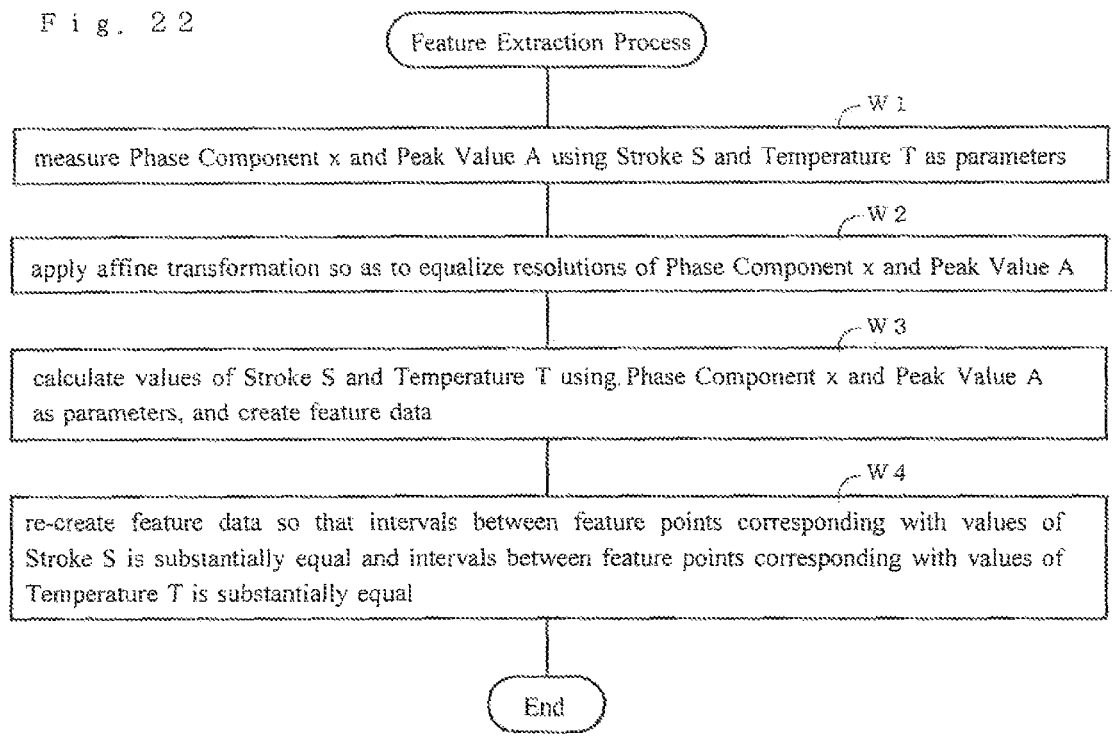
FIG. 22 is a flowchart of a feature extraction 30 process according to a third embodiment.

A third embodiment is identical in configuration with the second embodiment except for Step W4 of FIG. 22.

FIG. 22 is a flowchart of a feature extraction process for creating the feature table 51 in which feature points have substantially equally spaced distribution.

Steps W1 to W3 are same as those of FIG. 14.

At Step W4, the feature table 51 is re-created so that values of the phase component x and the peak value A of the feature points indicated in FIG. 15 are substantially equally spaced.

Figure 23:
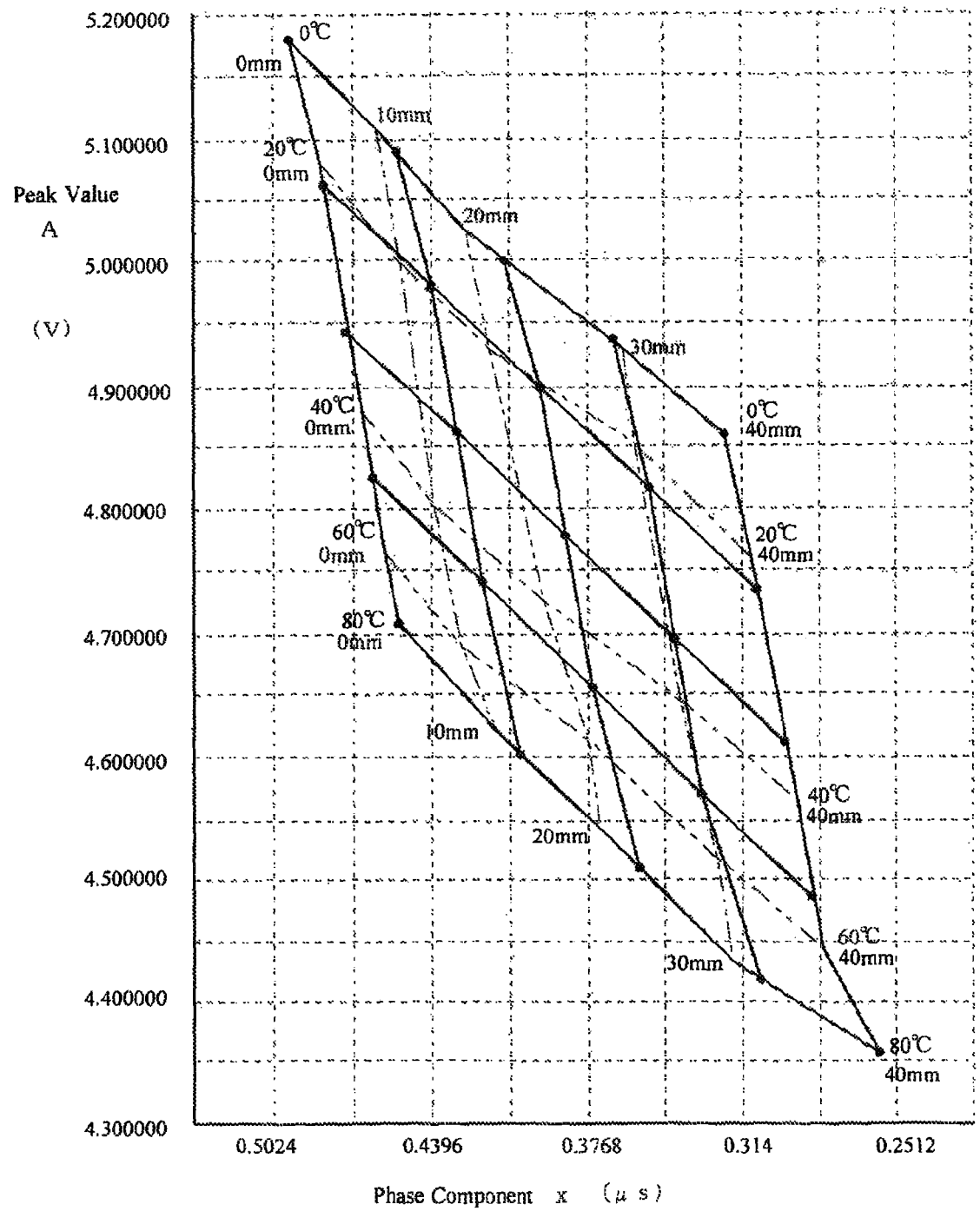
FIG. 23 is a graph obtained by plotting values shown in a feature table according to the third embodiment.

A mesh indicated by solid lines in FIG. 23 represents the re-created feature table 51. Meanwhile, alternate long and two short dashed lines indicate the mesh indicated in FIG. 15.

The measuring apparatus according to the present invention can be utilized to measure both a stroke and a temperature of a cylinder built in a machine.

EXPLANATIONS OF LETTERS AND NUMERALS 1 coil
2 conductive cylinder
3 capacitor
4 resistor
5 processor
6 DA converter
7, 8 AD converter
10 sensor unit
100, 200 measuring apparatus

The invention claimed is:

1. A measuring apparatus comprising:
a sensor unit that includes a coil and an electrical conductor arranged such that an area of an overlap zone varies as a position of an object changes, or the coil and a magnetic member arranged such that an area of an overlap zone varies as a position of an object changes;
a capacitor and a resistor that make up a
series circuit, the series circuit including the coil; a voltage applying unit that applies an input voltage Vi to the series circuit;
a voltage detector that detects a voltage Vo across the capacitor or the resistor;
a phase detector that detects a phase of the voltage Vo;
a magnitude detector that detects a magnitude of the voltage Vo;
feature data in which the phase, the magnitude, an environmental temperature of the sensor unit, and a change in area of the overlap zone are associated with one another; and
a calculator that calculates the environmental temperature of the sensor unit and the change in area of the overlap zone based on the feature data using the detected phase and the magnitude obtained by actual measurement of the voltage Vo as parameters.

2. The measuring apparatus according to claim 1, wherein the feature data is created based on a result of measurement obtained by measuring the phase and the magnitude of the voltage Vo using the environmental temperature of the sensor unit and the change in area of the overlap zone as parameters.

3. The measuring apparatus according to claim 1, wherein the phase detector detects delay time D of the voltage Vo with respect to the input voltage Vi as the phase, and the magnitude detector detects a peak value A as the magnitude.

4. The measuring apparatus according to claim 1, wherein the input voltage Vi is a periodic function waveform having a period $\tau$,
the voltage detector detects the voltage Vo at a sampling interval k($=\tau*n/m$) which is calculated by dividing an integer n ($\geq 1$) multiple of the period $\tau$ of the input voltage Vi by an integer m ($\geq 8$),
the phase detector detects, as the phase, a phase component (x) based on "m*integer ($\geq 1$)" detected values of the voltage Vo, and
the magnitude detector detects, as the magnitude, the peak value A based on the "m*integer ($\geq 1$)" detected values of the voltage Vo.

* * * * *